United States Patent
Dulin et al.

(10) Patent No.: US 6,606,422 B1
(45) Date of Patent: Aug. 12, 2003

(54) METHOD AND APPARATUS FOR PROCESSING AND RECOVERING IMAGES

(75) Inventors: Serge Dulin, Grez sur Loing (FR); Gilles Richard, Paris (FR)

(73) Assignee: Symah Vision, Vanves (FR)

( * ) Notice: Subject to any disclaimer, the term of this patent is extended or adjusted under 35 U.S.C. 154(b) by 0 days.

(21) Appl. No.: 09/332,884

(22) Filed: Jun. 15, 1999

(51) Int. Cl.$^7$ ............................ G06K 9/36; H04N 5/225
(52) U.S. Cl. .................. 382/282; 382/300; 348/207.99
(58) Field of Search ................. 382/284, 282, 382/295, 296, 300, 302; 348/109, 23, 43, 47, 48, 49, 207.99, 441, 239, 454, 24, 25, 71, 93, 104, 208, 39, 159, 333.1, 333.12, 561, 578, 621, 581; 345/619, 620, 632, 720, 713

(56) References Cited

U.S. PATENT DOCUMENTS

| | | | | |
|---|---|---|---|---|
| 4,450,477 A | * | 5/1984 | Lovett | 348/473 |
| 4,633,293 A | * | 12/1986 | Powers | 348/441 |
| 4,692,806 A | | 9/1987 | Anderson et al. | 358/209 |
| 5,128,776 A | | 7/1992 | Scorse et al. | 358/426 |
| 5,353,392 A | * | 10/1994 | Luquet et al. | 345/632 |
| 5,436,672 A | | 7/1995 | Medioni et al. | 348/591 |
| 5,444,478 A | | 8/1995 | Lelong et al. | 348/39 |
| 5,515,485 A | * | 5/1996 | Luquet et al. | 345/435 |
| 5,600,368 A | | 2/1997 | Matthews, III | 348/143 |
| 5,689,302 A | * | 11/1997 | Jones | 348/218 |
| 5,745,305 A | | 4/1998 | Nalwa | 359/725 |
| 5,988,863 A | * | 11/1999 | Demos | 708/203 |
| 5,990,941 A | * | 11/1999 | Jackson et al. | 348/207 |

FOREIGN PATENT DOCUMENTS

| | | |
|---|---|---|
| EP | 0610863 | 8/1994 |
| EP | 0695085 | 1/1996 |
| EP | 0729275 | 8/1996 |
| WO | WO 93/02524 | 2/1993 |
| WO | WO 95/34172 | 12/1995 |
| WO | WO 96/36179 | 11/1996 |
| WO | WO 97/00581 | 1/1997 |
| WO | WO 97/34182 | 9/1997 |

* cited by examiner

*Primary Examiner*—Bhavesh M. Mehta
*Assistant Examiner*—Kanji Patel
(74) *Attorney, Agent, or Firm*—Larson & Taylor, PLC

(57) ABSTRACT

For displaying a selected zone of images belonging to a sequence of video images, each in the form of a matrix of pixels, on a display unit, a signal is generated by a fixed large-field camera having a definition that is greater than that of the display unit. A TV user or an operator at a control station selects a zone of format corresponding to that of the display unit in a field of view of the camera. The pixels of a modified image having the size and definition of the display unit are generated by interpolation from the pixels in the selected zone of the image supplied by the large-field camera. A device for implementing the method includes a module for warping the selected zone by operations of interpolation and resampling.

9 Claims, 2 Drawing Sheets

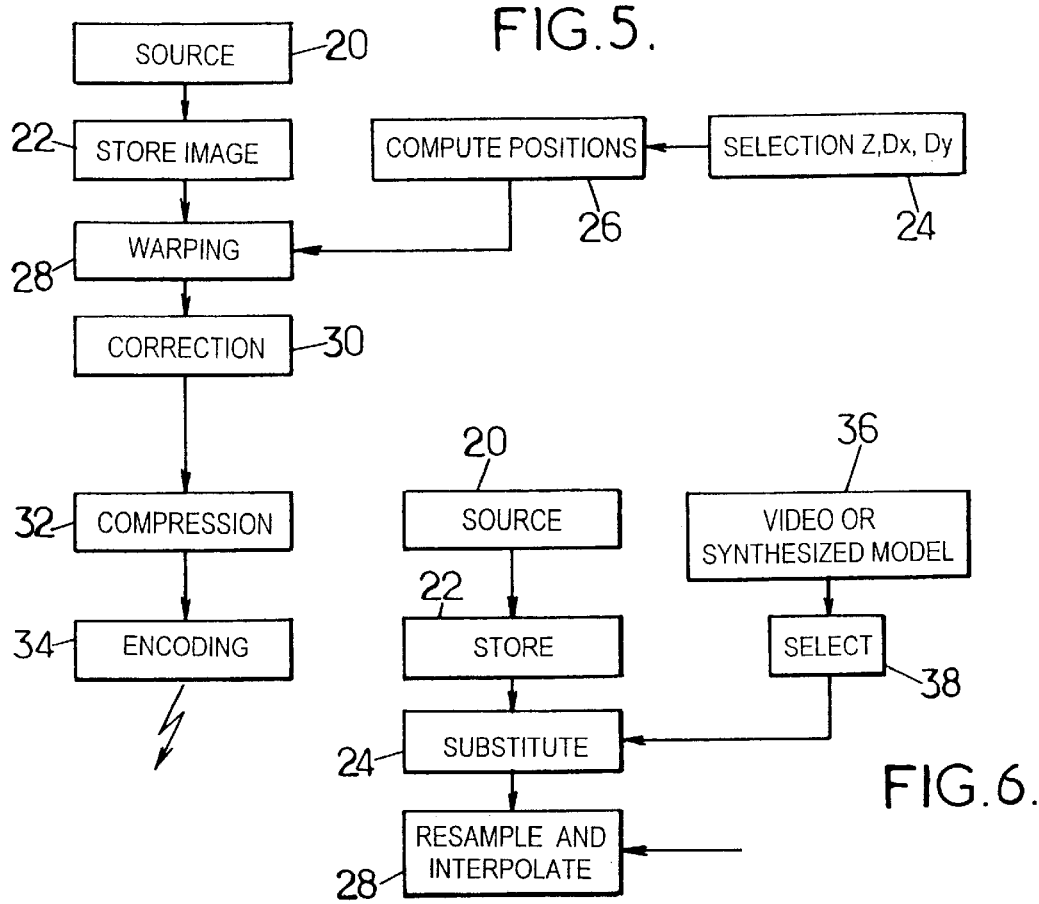
FIG.5.
FIG.6.
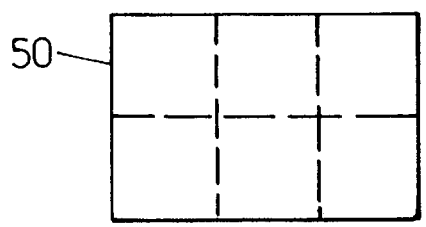
FIG.8.
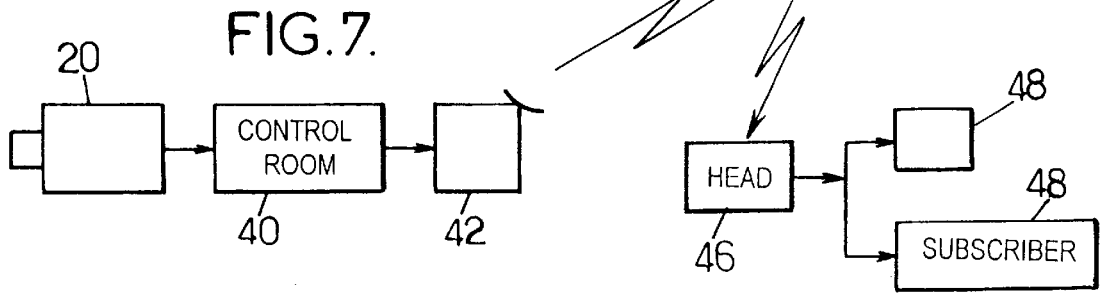
FIG.7.

METHOD AND APPARATUS FOR PROCESSING AND RECOVERING IMAGES

BACKGROUND OF THE INVENTION

The present invention relates to processing and recovering video images, each constituted by a matrix of pixels and represented by a signal which usually originated from a camera, but which could be a recorded signal.

An object of the invention is to provide a simple solution to the problem of recovering and displaying a selected fraction of an original video image, optionally together with a zoom effect.

Current practice for shooting a scene in which the center of interest moves consists in using a camera under the control of an operator who varies the direction in which the camera points, and also its degree of zoom and its focus so as to provide a "best" image, which is then broadcast and displayed as such, except where the image needs to be cropped in order to display a 16/9 format image on a 4/3 format TV screen (where format is expressed as a ratio of width/height). The only modifications that might be made are inlaying subtitles or symbols, with the background image remaining unchanged.

SUMMARY OF THE INVENTION

The present invention makes use of the fact that presently available techniques of resampling and interpolation make it possible to take a digital video image of the kind supplied by a high definition camera and to obtain therefrom a representation of sufficient quality comprising only a fraction of the actual image, which representation is in the form of a matrix of pixels displayed at a spatial definition greater than the original definition in said fraction of the image. This can be done using techniques referred to generically by the term "warping".

Consequently, there is provided a method of displaying a sequence of video images in the form of a matrix of pixels from a signal obtained from at least one fixed large-field camera having a definition that is generally greater than that of a unit for displaying a selected portion. A zone of format corresponding to that of the display member (generally 4/3) is selected dynamically from the field of the camera; and the pixels of an image of the size and definition of the display member are generated by interpolation from the pixels in the selected zone of the image supplied by the camera.

Implementation of the method may be rendered easier by using the fact since successive images of a video sequence present a high degree of natural correlation since the camera is fixed; implementation of compression techniques to reduce the data rate required to represent a very high definition image is then easier.

When using a single fixed camera, the camera is typically given a focal length such that the whole scene appears in its field. That leads to a focal length that is short, thereby making focusing easier, and generally making it possible to keep the focus setting permanently unchanged.

The zone of interest or selected portion can be selected by designating the location and the size of the zone or "window" to be displayed. Selection can be performed simply in the control room by means of a joystick or mouse type control unit for pointing to a corner of the window and also having a control member such as a set of pushbuttons for controlling zoom.

Instead of a single large field camera, it is possible to use a plurality of cameras having individual fields that present overlap so as to limit edge effects. The images from the cameras are merged in the control room. The cameras can be focused at different distances to take account of their distances from the scene at which they are pointing.

The invention can be implemented in highly flexible manner. As explained below, the window can be selected in the control room during a live broadcast from a studio; otherwise, it can be performed by a cable network supplier or by an Internet access supplier receiving the original signal over the air, by wire, or from a satellite. In all cases, there is no need for an. operator to be present behind the camera. Or at least the operator need do no more than set up the camera's initial adjustment and possibly change camera focus.

The invention can be applied to images originating from:
- a high definition 16/9 camera as presently available, which supplies a 1920×1152 matrix of pixels making it possible to extract directly a window of 720×576 pixels (or some other window) suitable for displaying on present-day TV screens and monitors;
- a single custom-mode camera having definition that is very much greater than that of current cameras; and
- a previous step consisting of merging images from a bank of cameras having overlapping fields of view and a same magnification.

In a first embodiment of the invention, the window is selected by an operator in the control room. The final image in its final state is broadcast (e.g. on air) or is transmitted (e.g. to a cable company, a satellite, an Internet access provider). This solution has the advantage of not increasing the data rate required, except between the camera and the control room. The operator in the control room can thus pan, tilt or zoom by purely electronic means, without the camera moving.

In a second embodiment, selection is performed by the user. The data rate required for the link is then considerably increased when a bank of cameras is used or when a very high definition camera is used. Because this approach requires a very large passband, it is suitable only for professional TV or for a link between a production site and a cable network head station which then broadcasts or retransmits to end users at a smaller data rate.

In yet another embodiment, applicable when the link with the end user includes a return channel, and when images are being transmitted as opposed to being broadcast, processing can take place in two stages. The user makes use of the return path to specify a determined fraction of the overall image which contains the window which the wishes to see. Fractions that a user can select may optionally be predefined. Thereafter the user acts locally to select the position and the size of the "window" that he wishes to see in the fraction of the image that he receives. Warping is performed locally.

This solution is particularly suitable for TV on the Internet—or more generally any extended computer network—since the user then has a home computer with a high level of computing power. In addition, the number of users connected to an access supply center remains limited and consequently implementation is compatible with the available bandwidth, which in any case must be high from the center, given that Internet type links are individual.

The high definition TV signal is always subjected to a high degree of compression prior to being broadcast or transmitted. This compression is made easier by the high degree of time correlation between successive images within a given sequence. The compression modes used at present, such as the several versions of the MPEG standard, are entirely compatible with the method of the invention.

Use may be made of a "pyramid" type compression algorithm; the principles thereof are described in the article "Pyramid-based extraction of local image features with applications to motion and texture analysis", SPIE, Vol. 360, page 114 by Peter J. Burt. This algorithm provides a representation in the form of a first model at very low definition, and successive models that add the data required to reach the desired maximum definition.

In yet another implementation, the original image is subjected to such compression, and selection causes data to be transmitted solely up to the level required for achieving satisfactory resolution in the window that has been selected for receiving, and taking account of the extent of the window.

However using the pyramid algorithm gives rise to a constraint: there is a limit on the number of scales that can be selected, and thus on the number of window sizes.

The representation of a window obtained merely by warping does not give rise to the same deformation or the same degree of optical defocusing as are generated by the imperfections of the optical systems in the cameras to which television viewers are presently accustomed. To ensure that the image as displayed is of an appearance comparable to that obtained during direct broadcasting of a television signal, artificial deformation can be added to the edges by adding a deformation computation term to the zoom and position selection terms in the resampling algorithm so as to provide an effect which is comparable to that of spherical projection.

The invention is particularly well suited to replacing a fixed designated "target" in the image as supplied by the camera with a representation of a "model" or a "pattern" constituted by a stored synthesized small size image or by a video sequence. When the camera is fixed and has a constant magnification, all that needs to be done is point once to the target which is to be replaced. Once the model has been inlaid, the operations or processing are the same as when there is no prior inlaying. That approach constitutes a considerable simplification as compared with U.S. Pat. No. 5,353,392 (Luquet et al.) to which reference may be made.

There is also provided apparatus enabling the above method to be implemented.

The above features and others will appear on reading the following description of particular implementations given as non-limiting examples. The description refers to the accompanying drawings.

BRIEF DESCRIPTION OF THE DRAWINGS

FIG. 5 is a simplified block diagram of an for apparatus;

FIG. 6 shows a fraction of a blockdiagram constituting a variant of that of FIG. 5;

FIG. 7 shows an example of how functions can be shared between the various components of a system for "live" broadcast; and FIG. 8 shows a predetermined way of subdividing an original image.

DETAILED DESCRIPTION

Figure 1:
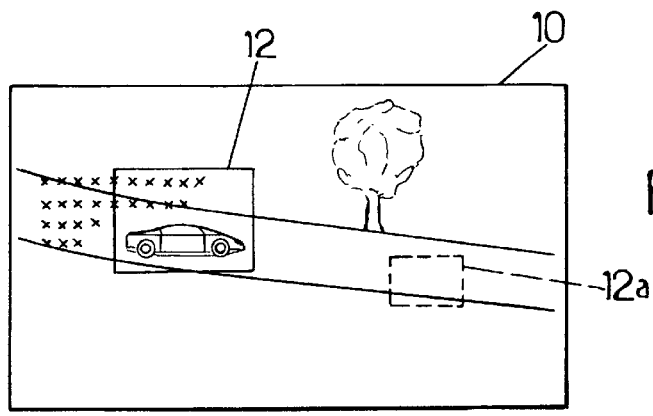
FIG. 1 is a diagram showing a window selected in a 16/9 TV image.
Figure 1A:
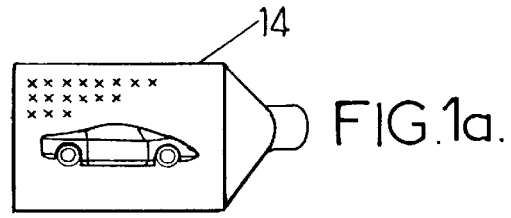
FIG. 1(a) is a diagram showing how the window is represented on a display unit such as a TV monitor, with just a few pixels being represented by crosses.
Figure 2:
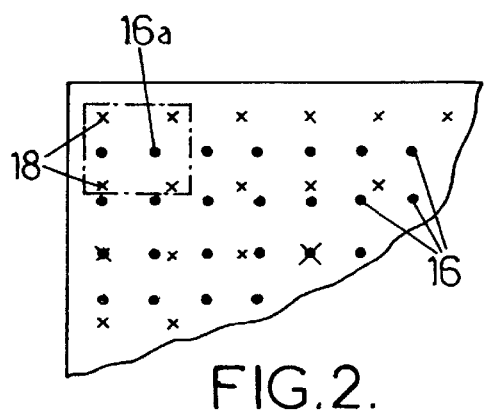
FIG. 2 shows an example of how conversion takes place from the pixels in the original image (represented by crosses) to pixels in the image as displayed (represented by dots)
Figure 4:
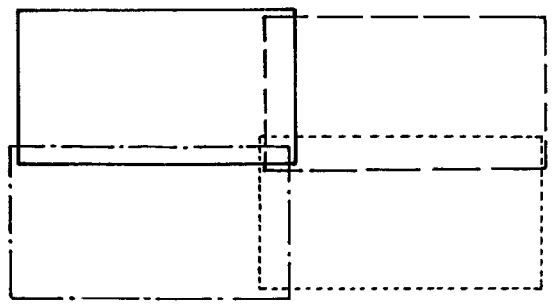
FIG. 4 shows how the fields from four cameras can be overlapped (the fields being represented respectively by solid lines, dashed lines, chain-dotted lines, and dotted lines), thereby making it possible to obtain an overall field that is large.

FIG. 1 shows a 16/9 format image 10 supplied by a high definition camera, and from which the method of the invention serves to select a 4/3 format window 12 that is to be played back on the screen 14 of a TV set (FIG. 1(a) in the form of a matrix of pixels having a number of pixels that is greater than the number to be found in the original image window and, in general, without there being coincidence between the original pixels and some of the pixels as displayed, as can be seen in FIG. 2 where the pixels 16 of the image on the screen are represented by dots.

Figure 3:
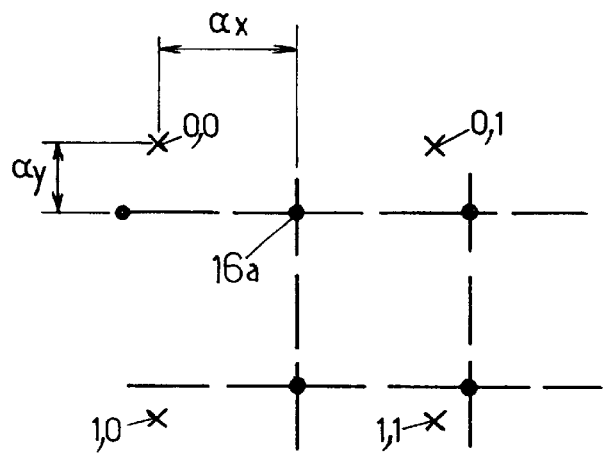
FIG. 3 shows the parameters that are involved in a bilinear resampling algorithm.

Various resampling techniques exist that make it possible to obtain and assign a radiometric value (brightness and/or color) to the pixels 16. A solution that is simple, but that gives results that are coarse, consists in giving to each pixel in the displayed image the value for the pixel that is the closest pixel in the original image. In general, it is better to use bilinear interpolation in which the value for a pixel 16a in the final image is calculated on the basis of the intensities of the four original pixels 18 surrounding it, as represented by a chain-dotted box in FIG. 2. In FIG. 3, the pixels of the original image surrounding the pixel 16a are given coordinates 0, 0; 0, 1; 1, 0; and 1, 1.

The first operation performed consists in determining for each pixel of the final image having coordinates x, y in the display matrix, the coordinates x', y' of the corresponding location in the original image. This correspondence is linear:

$x' = Zx + D_x$, and $y' = Zy + D_y$.

In this formula, Z is the degree of zoom and D is the overall shift in x or y.

If the decimal portion of x' is written $\alpha_x$ and the decimal portion of y' is written $\alpha_y$ (FIG. 3), then weighting coefficients can be calculated of the form:

$\beta_{00} = (1-\alpha_x) \cdot (1-\alpha_y)$ $\beta_{11} = \alpha_x \cdot \alpha_y$ If $I_{0,0}$, $I_{0,1}$, $I_{1,0}$, and $I_{1,1}$ are used to represent the radiometric intensity of the four original pixels, the value to be given to the pixel 16a is given by:

$I = \beta_{0,0} \cdot I_{0,0} + \ldots + \beta_{1,1} \cdot I_{1,1}$.

As shown in FIG. 5, the source 20, such as the camera, can supply a high definition digital signal to an image memory 22. A unit 24 supplies the values Z, D and Dx and Dy to a module 26 which may be implemented in hardware or software. This module calculates the positions of pixels which, within the original image, would correspond to pixels in the display matrix. These positions are supplied to a hardware or software module 28 which performs warping by resampling. A module 30 may optionally perform corrections in the edge zones of the display image. These corrections can also be performed during position calculation by adding an additive correction term to the formulae for converting from x, y to x', y'.

The image is then subjected to compression by algorithms which can be conventional, and the resulting modulating signal is applied to a module 34 for encoding, modulation, and broadcasting.

The same method is applicable when the original image results from juxtaposing a plurality of images 36. In this case, the source 20 is constituted by a plurality of cameras and by a module for merging the images therefrom, which module performs weighting in the overlap zones.

In the modified embodiment shown in FIG. 6, where modules corresponding to those of FIG. 5 are given the same reference numerals, warping 28 is preceded by overlaying a model that is constituted by a video sequence that has been scaled or by a synthesized model. A module 36 is used which is constituted, depending on circumstances, either by a source of directly recorded video, or else by a memory containing a synthesized model. A module 38 serves to select the "target" that is to be replaced in the image. Selection can be performed purely manually without any shape recognition operation, and it can be performed once only given that the image coming from the source 20 is fixed in position and size. Subsequent operations are the same as those shown in FIG. 5.

In the implementation shown in FIG. 7, the selection and resampling (warping) are performed in a control room 40. The operator selects the window which is to be broadcast, and can, for example, cause its position to vary over time from position 12 to position 12a in FIG. 1. The resulting image signal is subjected at 42 to conventional operations of compression, encoding, modulation, and transmission (possibly together with scrambling and/or enciphering). In the example shown, the signal is transmitted on an uplink to a relay satellite 44 which feeds a cable network head 46 that distributes the program to users 48.

In a modified implementation, the signal transmitted by the satellite 44 on a down link is the original signal. Selection and resampling are performed by the cable operator. This makes it possible for operators in different countries to perform selections that are different. Mention can be made, for example, of athletics competitions where several events take place simultaneously and where the operator in each country will select an event having a competitor from that country.

In yet another embodiment, usable when a return channel is available, the end user is given the option to perform a limited amount of selection.

For example, the original large field image 50 is subdivided into a plurality of zones, shown by dashed lines in FIG. 8.

It is then possible to give the user/subscriber at least two options:

a first option consists in allowing the user to select between a plurality of predefined fractions of the image: under such circumstances, the network operator broadcast or transmits to the use only that portion of the signal which represents the selected fraction, with this being facilitated by the usual way of performing space compression and encoding which operates on blocks of 16×16 or 8×8 pixels and which uses a space-frequency transform, together with the usual time compression, e.g. MPEG 2. The network operator can also generate a signal that is very highly compressed (e.g. to the first level of a pyramid algorithm) giving a coarse view of the entire field so as to make selection possible;

another option, which is particularly advantageous for TV via the Internet, i.e. on a computer network where each subscriber receives a signal addressed specifically to that user, consists in sending a signal that is encoded using a pyramid algorithm.

In this case, the subscriber-user has computation power available making it possible to perform decompression which, depending on the extent that is to be viewed, can be obtained by using:

either all of the levels of the pyramid algorithm (which is a purely spatial algorithm), but only on a fraction of the signal representing a window of small size to be displayed;

or else the low levels of the representation supplied by the pyramid algorithm, which suffice because of the high definition in the initial image, when it is desired to show a window of very large extent, or even comprising the entire original image.

We claim:

1. A method of displaying a selected zone of successive images belonging to a sequence of video images, each in the form of a matrix of pixels, on a display unit, comprising the steps of:

(a) providing a signal originating from at least one fixed large-field camera having a resolution that is greater than that of said unit and representing said video images;

(b) dynamically and optionally selecting, at any place in the camera field, and designating a zone having a width/height ratio corresponding to that of the display unit in said video images; and (c) generating pixels of modified images representing said selected zone, having a size and the resolution of the display unit by interpolation from the pixels in the selected zone of the video images;

further comprising, between steps (a) and (b), designating a target of constant size and position in the image of the scene viewed by the fixed camera; and processing the signal delivered by the camera by inlaying a stored pattern into said image in place of the target.

2. The method of claim 1, wherein the signal of step (a) is continuously formed by combining signals from a plurality of cameras having individual fields that overlap to limit edge effects and having a common magnification so as to merge images from said cameras.

3. The method of claim 1, wherein step (b) is carried out by an operator in a control room and said modified image is broadcast or transmitted.

4. The method of claim 1, wherein steps (b) and (c) are carried out at a head of a television distribution network which receives the video signal from a production site and said head broadcasts at a rate lower than a rate required for displaying the video signal.

5. The method of claim 1, further including the step of a user or subscriber specifying a determined fraction of transmitted overall images which contains the zone which he or she wishes to see on a return channel, wherein warping is performed locally.

6. The method of claim 5, wherein said determined fraction is specified among only a plurality of predetermined fractions and only the determined fraction is transmitted to the user, comprising the additional step of local selection by the user of a position and size of a window to be displayed locally after said warping.

7. The method of claim 6, further comprising the step of compressing the video signal according to a pyramid algorithm at a plurality of compression levels and transmitting at a level depending on the size of the selected window.

8. A method of displaying a selected zone of successive images belonging to a sequence of video images, each of said video images in the form of a matrix of pixels, on a TV set controlled by a subscriber and provided with a return channel toward a distribution network head, comprising the steps of:

(a) providing a signal originating from at least one fixed large-field camera having a resolution that is greater than that of said TV set and representing said video images;

(b) designating at will from the TV set a determined portion of the video images and sending an identification of the determined portion to the network head via said return channel;

(c) sending only that portion of the signal which represents said determined portion from the network head to the TV set;

(d) from the TV set, selecting at will a zone having a format corresponding to that of the TV set in said determined portion under control of the subscriber; and (e) generating pixels of a modified image having a size and the definition of the TV set by warping the selected zone.

9. A device for causing display of a selected zone of successive images belonging to a sequence of video images represented by a signal originating from at least one fixed large-field camera having a resolution that is greater than that of units for displaying said display; means for enabling an operator to dynamically select a zone having a format corresponding to that of the display units in said video images; means for generating pixels of modified images having a size and definition of the display units by interpolation from the pixels in the selected zone of the video image; means for broadcasting a signal representing the modified image toward the display units; means for enabling said operator to select a fixed target of constant size, once for all, in a scene as viewed by the camera; and means for inlaying a representation of a stored pattern warped to match said target in place of the target prior to broadcasting.

* * * * *